July 8, 1947.　　　V. D. LANDON　　　2,423,506
WAVEMETER FOR CENTIMETER WAVES
Filed Nov. 29, 1943
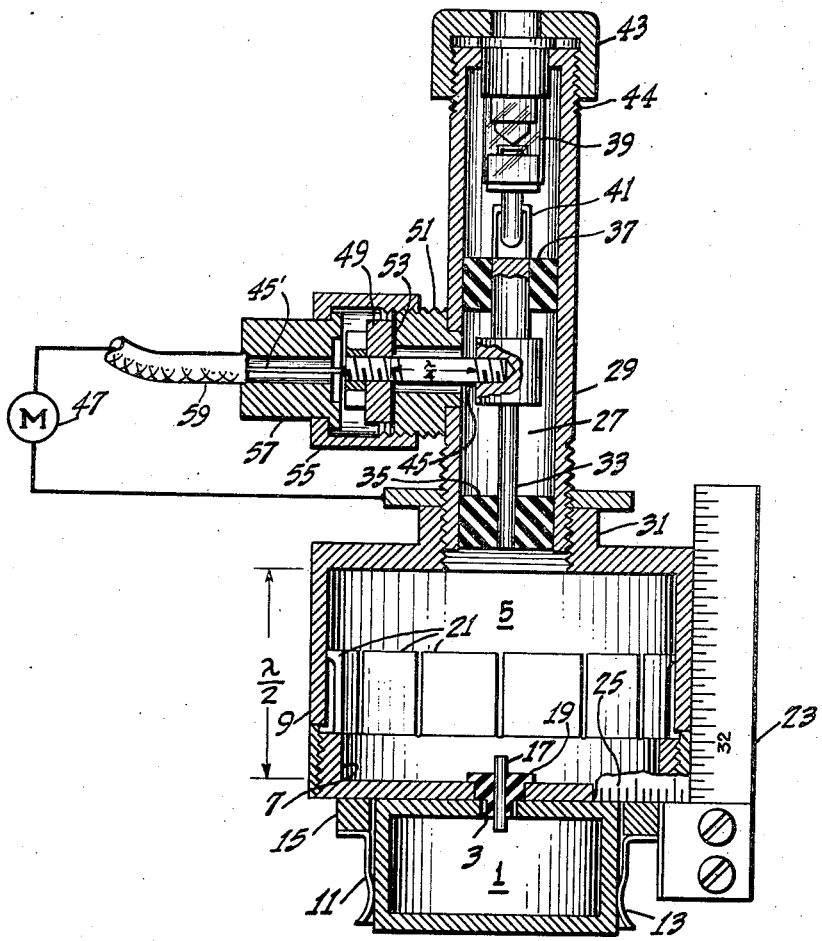
Inventor
VERNON D. LANDON
By
CD Tuska
Attorney Patented July 8, 1947

2,423,506

UNITED STATES PATENT OFFICE 2,423,506

WAVEMETER FOR CENTIMETER WAVES

Vernon D. Landon, Princeton, N. J., assignor to Radio Corporation of America, a corporation of Delaware Application November 29, 1943, Serial No. 512,149

6 Claims. (Cl. 250—39)

This invention relates generally to microwave apparatus and more particularly to wavemeters for measuring centimeter waves in waveguide transmission systems.

It is highly desirable that wavemeters for measuring the wavelength of microwave energy in super-high frequency waveguide transmission systems provide the desired indications with minimum absorption of microwave energy from the transmission system. It is further desirable that such wavemeters have a relatively high Q in order that the desired accuracy of wavelength indication may be readily obtained and minimum energy loss encountered in such measurements. Another requisite of such wavemeters is that contact between moving parts shall occur at points of low microwave current distribution in order to minimize objectionable contact effects.

The instant invention includes a section of round waveguide one-half wavelength long which comprises two telescopic cylindrical sections providing a cavity resonator of adjustable volume and length. The cavity resonator is coupled loosely through an aperture in the waveguide transmission system by means of a short, input coupling rod which extends into the waveguide and cavity resonator. A microwave crystal detector is inserted in series with the inner conductor of a short coaxial transmission line which is loosely coupled to the end of the cavity resonator remote from the input coupling rod. A relatively large fixed capacitor bypasses the microwave energy around an indicator circuit which is connected to the short coaxial cable and which includes a conventional galvanometer or other indicator for indicating the adjustment of the cavity resonator to resonance with the microwave energy in the waveguide transmission system. Electrical contact between the telescoping cylindrical portions of the cavity resonator is provided by a plurality of flexible contacts connected to one of the cylindrical portions and touching the other portion at points of minimum microwave current distribution.

Among the objects of the invention are to provide an improved method of and means for measuring the wavelength of microwave energy in a waveguide transmission system. Another object of the invention is to provide an improved method of and means for absorbing a small amount of microwave energy from a waveguide transmission system and indicating the wavelength of said microwave energy in terms of the physical proportions of the absorption medium. An additional object of the invention is to provide an improved microwave wavemeter which includes an adjustable cavity resonator and means for indicating the adjustment of said cavity resonator to resonance with the microwave energy in said waveguide transmission system. An additional object of the invention is to provide an improved adjustable high Q microwave wavemeter which includes a cavity resonator responsive to energy in said waveguide and a microwave detector and indicator for indicating the response of said cavity resonator to said microwave energy. Another object of the invention is to provide an improved super-high-frequency wavemeter comprising an adjustable cavity resonator having means for establishing standing waves therein in response to applied microwave energy, said standing waves having substantially no modes dependent upon circular symmetry of said resonator, and means for indicating resonance to said applied microwave energy.

The invention will be further described by reference to the accompanying drawing of which the single figure is a cross-sectional elevational view of a preferred embodiment thereof.

Referring to the drawing, a rectangular waveguide 1 includes an aperture 3 preferably centrally located axially along one of the wide faces of the waveguide 1. A cavity resonator 5, consisting of two complementarily threaded cylindrical conductive elements 7, 9, is arranged to slide longitudinally along the waveguide 1 and to be held in any desired longitudinal position by means of spring clamps 11, 13 fastened to projections 15 on the annular end portion of the cylindrical resonator element 7. A microwave energy coupling stub or input coupling rod 17, supported by an insulator 19, extends through an aperture in the center of the end of the cavity resonator member 7 coincidental with the aperture 3 of the waveguide 1. The coupling stub 17 extends a short distance into the interior of the waveguide 1 and a similar distance into the interior of the cavity resonator 5 and provides loose microwave coupling between the waveguide and the cavity resonator. A plurality of flexible contact elements 21 are secured to the inner surface of the cavity resonator element 7 and touch the inner surface of the other cavity resonator element 9 at points which are of the order of one-quarter wavelength from the opposite end of the cavity resonator element 9.

The cavity resonator element 9 may be rotated with respect to the complementarily threaded resonator element 7 to vary the length of the cavity resonator and hence the resonant frequency thereof. At resonance, the internal electrical length of the cavity resonator will be of the order of one-half wavelength while the internal diameter will be at least .584 wavelength at the lowest operating microwave frequency. A vertical scale 23, disposed adjacent the telescopic cavity resonator portions 7, 9, may be employed to indicate the number of turns to which the resonator portions are adjusted, and a vernier scale 25 on the periphery of the outer cavity resonator element 9 may include fiducial marks to indicate fractions of turns of adjustment. If desired, either or both indicators may be calibrated in wavelength or frequency.

A coaxial transmission line section 27 includes an outer conductor 29 threaded to the annular end portion 31 of the cavity resonator 5 remote from the coupling stub 17. The inner conductor 33 of the concentric transmission line 27 is supported by insulators 35, 37. A microwave crystal detector 39 is effectively connected to one end of the inner coaxial line conductor by means of flexible contacts 41. The remaining terminal of the crystal detector 39 is secured to the end of the outer coaxial line conductor 29 by means of a threaded cap 43 engaging complementary threads 44 in the end of the coaxial line outer conductor 29. The crystal detector may comprise, for example, a silicon-tungsten device of the type described in the copending U. S. application of William D. Larue, Serial No. 432,818 filed February 28, 1942 and assigned to the same assignee as the instant application.

A connection 45 is made to any convenient point on the inner conductor 33 of the coaxial transmission line 27 for coupling the conductor 33 to one terminal of any suitable external indicating instrument 47. The remaining terminal of the external indicating instrument 47 is connected to the outer conductor 29 of the coaxial line 27. The connecting element 45 is made one-quarter wavelength to minimize radio frequency currents therein. Microwave energy on the indicator conductor 45′ is effectively bypassed around the indicator cable and indicator by means of an effectively large capacity formed between a capacitive element 49 and a threaded collar 51 surrounding the indicator conductor 45′ adjacent its connection to the inner coaxial line conductor 33. The capacitive element 49 and threaded collar 51 are separated by a thin layer of, for example, mica 53 to provide D.-C. insulation and to increase the capacity therebetween. A threaded sleve 55 and a conductive grommet 57 provide suitable support for the indicator conductor 45′ at the point of entry into the coaxial line 27, and also provide grounding of a shielding conductive braid 59 surrounding the insulated indicator conductor 45′.

It should be understood that the indicator 47 may be any type of instrument providing the required sensitivity for indicating accurately the adjustment of the telescopic portions of the cavity resonator to resonance with the microwave energy in the waveguide transmission system. It further should be understood that an amplifier, not shown, may be inserted between the concentric line 27 and the indicator 47 to increase the sensitivity of the indicator. Longitudinal adjustment of the wavemeter along the axis of the waveguide will provide coupling therebetween under any desired microwave energy conditions and thereby provide means for adjusting the effective coupling between the waveguide 1 and the cavity resonator 5.

Thus the invention disclosed comprises an improved high Q wavemeter for measuring microwave energy in a waveguide transmission system wherein indications of the microwave frequencies may be obtained with minimum power absorption and energy loss in the wavemeter circuits.

I claim as my invention:

1. A microwave wavemeter for a waveguide transmission system including a cavity resonator comprising two hollow conductive elements disposed in adjustable telescopic relation, means for introducing microwave energy from said waveguide into said resonator, means for adjusting said telescopic relation of said elements to establish standing microwaves in said resonator in response to said microwave energy, means including a concentric line loosely coupled to said resonator to induce in said line signal currents in response to said standing waves, a detector connected in said line to rectify said signal currents to provide signal demodulation currents, and indicator means coupled to said line and responsive to said demodulation currents for indicating resonance of said cavity resonator to said microwave energy.

2. A microwave wavemeter for a waveguide transmission system including a cavity resonator comprising two complementarily threaded hollow conductive cylindrical elements disposed in adjustable telescopic relation, means for introducing microwave energy into said resonator, means for adjusting said telescopic relation of said elements to establish standing microwaves in said resonator in response to said microwave energy, means including a concentric line loosely coupled to said resonator to induce in said line signal currents in response to said standing waves, a detector connected in said line to rectify said signal currents to provide signal demodulation currents, and indicator means coupled to said line and responsive to said demodulation currents for indicating resonance of said cavity resonator to said microwave energy.

3. A microwave wavemeter for a waveguide transmission system including a cavity resonator comprising two complementarily threaded hollow conductive cylindrical elements disposed in adjustable telescopic relation, at least one flexible contact connected to the inner surface of one of said elements and in sliding contact relation with the inner surface of the other of said elements at points of substantially minimum microwave current distribution in said elements of said resonator, means for introducing microwave energy into said resonator, means for adjusting said telescopic relation of said elements to establish standing microwaves in said resonator in response to said microwave energy, means including a concentric line disposed coaxially with said resonator and loosely coupled to said resonator to induce in said line signal currents in response to said standing waves, a crystal detector disposed within said line and connected in said line to rectify said signal currents to provide signal demodulation currents, and indicator means coupled to said line and responsive to said demodulation currents for indicating resonance of said cavity resonator to said microwave energy.

4. Apparatus of the type described in claim 2 including fiducial means for indicating said telescopic relation of said elements.

5. A super-high-frequency wavemeter comprising a substantially closed cylindrical cavity resonator of adjustable length, a microwave input coupling rod protruding into said resonator through the center of one end of said cylindrical resonator whereby standing waves may be established in said resonator, said standing waves having substantially no modes dependent upon circular symmetry of said resonator, microwave output coupling means disposed at the center of the remaining end of said resonator, and means for indicating resonance of said resonator to microwave energy introduced therein.

6. A super-high-frequency wavemeter comprising a substantially closed cylindraceous cavity resonator of adjustable length, microwave input coupling means protruding into said resonator through the center of one end of said resonator whereby standing waves may be established in said resonator, said standing waves having substantially no modes dependent upon circular symmetry of said resonator, microwave output coupling means disposed at the center of the remaining end of said resonator, and means for indicating resonance of said resonator to microwave energy introduced therein.

VERNON D. LANDON.

REFERENCES CITED

The following references are of record in the file of this patent:

UNITED STATES PATENTS

| Number | Name | Date |
|---|---|---|
| 2,167,201 | Dallenback | July 25, 1939 |
| 2,349,440 | Laboie | May 23, 1944 |
| 2,106,713 | Bowen | Feb. 1, 1938 |
| 2,106,771 | Southworth | Feb. 1, 1938 |
| 2,280,824 | Hansen et al. | Apr. 28, 1942 |